United States Patent [19]
Humburg

[11] Patent Number: 5,174,254
[45] Date of Patent: Dec. 29, 1992

[54] COOLANT CIRCUIT WITH A HEATER FOR A VEHICLE ENGINE

[75] Inventor: Michael Humburg, Göppingen, Fed. Rep. of Germany

[73] Assignee: J. Eberspächer, Esslingen, Fed. Rep. of Germany

[21] Appl. No.: 806,884

[22] Filed: Dec. 12, 1991

[30] Foreign Application Priority Data

Dec. 28, 1990 [DE] Fed. Rep. of Germany ....... 4042123

[51] Int. Cl.⁵ .............................................. F02N 17/02
[52] U.S. Cl. .......................... 123/142.5 R; 123/41.08; 123/41.09; 237/5; 237/12.3 C
[58] Field of Search ............. 123/142.5 R, 41.08, 123/41.09; 236/34, 34.5; 237/12.3 C, 5

[56] References Cited

U.S. PATENT DOCUMENTS

| | | | |
|---|---|---|---|
| 3,122,319 | 2/1964 | Friedl | 237/12.3 B |
| 4,010,895 | 3/1977 | Kofink et al. | 237/12.3 C |
| 4,018,380 | 4/1977 | Baier | 237/12.3 |
| 4,258,676 | 3/1981 | Lamm | 123/142.5 |
| 4,644,909 | 2/1987 | Nishikata et al. | 236/34.5 |
| 4,756,359 | 7/1988 | Greer | 123/142.5 R |
| 5,048,752 | 9/1991 | Hintennach et al. | 123/142.5 R |

FOREIGN PATENT DOCUMENTS

| | | | |
|---|---|---|---|
| 2755463 | 5/1979 | Fed. Rep. of Germany | 236/34.5 |
| 2755465 | 6/1979 | Fed. Rep. of Germany | 236/34.5 |
| 2923523 | 12/1980 | Fed. Rep. of Germany | 236/34.5 |
| 2932078 | 2/1981 | Fed. Rep. of Germany | 236/34.5 |
| 3313896 | 10/1984 | Fed. Rep. of Germany | 236/34.5 |

Primary Examiner—E. Rollins Cross
Assistant Examiner—Erick Solis
Attorney, Agent, or Firm—McGlew and Tuttle

[57] ABSTRACT

Coolant circuit of an internal combustion engine for a motor vehicle, which connects the internal combustion engine, a coolant/air heat exchanger for an interior space of the vehicle, and a combustion gas/coolant heat exchanger of a heater generating heat by combustion. The coolant circuit has a bypass line bypassing the internal combustion engine and a thermostat valve which regulates the return temperature in a predetermined range of adjustment by controlling coolant flow through the bypass line and/or the internal combustion engine. The thermostat valve is provided with at least two valves formed by valve seats and valve sealing elements, especially valve disks, wherein the range of adjustment of the thermostat valve (12) can be modified from the outside.

11 Claims, 4 Drawing Sheets

COOLANT CIRCUIT WITH A HEATER FOR A VEHICLE ENGINE

FIELD OF THE INVENTION

The present invention pertains to a coolant circuit of an internal combustion engine for a motor vehicle, which connects the internal combustion engine, a coolant/air heat exchanger for an interior space of a vehicle, and a combustion gas-coolant heat exchanger of a heater generating heat by combustion, wherein the coolant circuit has a bypass line bypassing the internal combustion engine and a thermostat valve, which is provided with at least two valves formed by valve seats and valve sealing elements, especially valve disks and regulates the return temperature in a predetermined range of adjustment by controlling the coolant flow through the bypass line and/or the internal combustion engine.

BACKGROUND OF THE INVENTION

Vehicle heaters which generate heat by combustion and thus represent a heat source for the vehicle have been known for quite a long time. The heater supplies heat for an interior space of a vehicle and/or for preheating the internal combustion engine of the motor vehicle prior to cold start. Heat generation for an interior space of a vehicle may be heat generation with the internal combustion engine not running ("space heating") or auxiliary heat generation in the case of insufficient heat supply from the internal combustion engine ("supplementary heating").

In many cases, the heater is connected into the coolant circuit of the vehicle engine, especially because both preheating of the engine and heating of the interior space are thus possible, and because the vehicles own warm air distribution system can be optimally utilized for the interior space of the vehicle. The most efficient subdivision of the heating capacity of the heater between the interior space of the vehicle and the internal combustion engine was the object of many different considerations and solutions, especially also because, depending on the conditions of use and the weather conditions, various aspects were in the foreground. Providing a bypass line leading past the internal combustion engine and using a valve to control whether the coolant flow passes through the internal combustion engine, the bypass line, or, in defined quantity ratios, through both the internal combustion engine and the bypass line, has proved to be a favorable solution. When the coolant flow passes completely through the bypass line, the heating capacity of the heater is concentrated on use for heating the interior space of the vehicle; the internal combustion engine itself is not heated at all. When the coolant flow passes completely through the internal combustion engine, it receives maximum heating; the heating capacity used to heat the internal combustion engine reduces the heating capacity available for heating the interior space of the vehicle.

The prior-art valves used in the coolant circuit described are thermostat valves which regulate the return temperature in the coolant circuit within a predetermined range of adjustment. The return temperature is the temperature with which the coolant passed through the internal combustion engine and/or the bypass line is returned to the heater in order to be again heated there. The prior-art thermostat valves operate so that coolant is fed to the internal combustion engine only when its temperature is higher than the temperature set point set by the range of adjustment of the thermostat valve in the return of the coolant circuit. Consequently, the thermostat valve always sends to the internal combustion engine only just enough heat for heating it as is superfluous in the return with respect to the temperature set point. Such an engine preheating is especially suitable under cold start conditions. If the outside temperatures are high enough, i.e., when preheating the engine is unnecessary or when the engine still has sufficient residual heat from preceding operation for starting at lower outside temperatures, it is unfavorable from the viewpoint of energy utilization to heat the internal combustion engine much more intensely than would be necessary, because of the established temperature set point of the thermostat valve the heater in the coolant circuit would have to be operated at a higher output to heat the interior space of the vehicle.

SUMMARY AND OBJECTS OF THE INVENTION

The primary object of the present invention is to provide a thermostat valve for a coolant circuit of the above-described class which makes it possible to influence the distribution of the amount of available heat between the internal combustion engine and the interior space of the vehicle, while maintaining the regulating function of the thermostat valve.

To accomplish this task, the coolant circuit is characterized according to the present invention in that the range of adjustment of the thermostat valve can be changed from the outside.

The basic idea of the present invention is to provide a possibility—by making it possible to intervene from the outside, i.e., without interrupting or limiting the regulating function of the thermostat valve—to modify the range of adjustment of the thermostat valve and consequently the temperature set point in the return of the coolant circuit when needed, so that the internal combustion engine will be preheated optionally at a higher or lower intensity than is done in the case of the originally preset temperature set point of the thermostat valve.

In a preferred embodiment of the coolant circuit according to the present invention, the thermostat valve is provided with an adjusting device acting from the outside on the valve seats or the valve disks. The adjusting device makes possible a relative displacement between the valve seats and the valve disks, which are arranged on an expanding material element in a thermostat valve. The range of adjustment of a thermostat valve arranged in the coolant circuit is limited by the temperature at which the flow through the internal combustion engine is released due to opening of a first valve (opening temperature) and the temperature at which a second valve in the thermostat valve closes the flow through the bypass line, so that the coolant flow is passed completely through the internal combustion engine (closing temperature). The range of adjustment defined by the temperature difference between the closing temperature and the opening temperature is determined by selecting the expansion material element, on which the valve disks releasing and closing the above-mentioned valves are arranged. When the operating temperature is reached, the expanding material element begins to expand, and the valve of the thermostat valve that regulates the flow through the internal combustion engine begins to open. The adjusting device now permits a relative displacement to take place between the valve seat and the valve disk of the valve, so that. e.g., in the case of a displacement of the valve seat in the direction of expansion of the expanding material element, opening of the valve is brought about only at an increased temperature proportional to the value of the displacement. It is particularly advantageous to provide the adjusting device with an adjusting drive. The adjusting drive offers, amoung other things, the advantage of providing for remote adjustment, so that the adjusting device may be actuated from the interior space of the vehicle.

The present invention also pertains to a thermostat valve, especially for controlling coolant flows in a coolant circuit provided with a heater for an internal combustion engine for a motor vehicle, with a valve housing having two intake chambers and one discharge chamber and a valve piston designed as an expanding material element with two valve disks which, cooperating with valve seats separating the intake chambers from the discharge chambers, form valves, characterized in that the relative position of the valve seats in relation to the valve disks can be changed from the outside, and sealing between an intake chamber and the discharge chamber, which sealing is at least partially independent of the change in the relative position, is ensured by appropriately designing a valve seat and/or a valve disk.

Consequently, a special thermostat valve is provided according to the present invention, separated from the situation in which it is built into the coolant circuit. This valve is preferably intended for installation in the coolant circuit being disclosed here. Therefore, it may preferably possess one or several of the variant characteristics that are disclosed here in connection with the situation in which they are installed in the coolant circuit.

According to the present invention, a thermostat valve is characterized, besides the possible relative displacement between the valve seats and the valve disks, by the fact that by appropriately designing a valve, the sealing effect between the valve disk and the valve seat is preserved during an the expansion section that corresponds to the change in the opening temperature of the valve.

In a preferred exemplary embodiment of the thermostat valve according to the present invention, this is achieved by designing the valve seat associated with the engine-side intake chamber as a sleeve in parallel to the direction of expansion of the expanding material element. The valve seats are connected to an adjusting device that is guided in the valve housing and can be adjusted from the outside via an adjusting piston extending from the valve housing. It is thus possible to displace the valve seats in parallel, so that, even though a change in the opening temperature is achieved, the temperature difference between the opening temperature and the closing temperature of the range of adjustment remains the same. Consequently, a change in the range of adjustment is a parallel displacement, comparable to the displacement of the valve seats. Via the adjusting piston, this parallel displacement can be performed from the outside. The adjusting device preferably has an adjusting frame accommodating the valve seats. The dimensions of this frame can be adjusted to the interior space conditions of the valve housing, so that guiding of the adjusting frame by the valve housing is ensured. However, it is also possible to design the adjusting frame in the manner of a valve seat, so that the valve seats and the adjusting frame form one unit.

To ensure simple and effective actuation from the outside, the adjusting piston extending from the valve housing is in a functional connection with an adjusting drive. The adjusting drive may have an electric motor for operating the adjusting device. However, the adjusting drive may also be provided with an adjusting screw that permits manual adjustment of the adjusting frame. It is particularly advantageous to provide the adjusting drive with an electrically heatable expanding material element. This ensures a particularly space-saving adjusting drive of simple design, which also permits simple coupling with already existing measurement transducers in the motor vehicle, which coupling induces adjustment of the adjusting frame. It appears particularly advantageous in this connection to electrically connect the expanding material element to the oil temperature sensor of the internal combustion engine. The oil temperature now acts as an actuating variable for changing the range of adjustment of the thermostat valve by the adjusting piston that is in functional connection with the expanding material element.

The motor vehicles for which the present invention is preferably intended are especially buses, trucks, ordinary passenger cars (smaller than buses), earth-moving equipment, such as bulldozers, motor homes, and boats. "An interior space of a vehicle" is referred to in the claims because some of the said vehicles also have a plurality of interior spaces, e.g., a truck has the driver's cab and the cargo space. The heater is advantageously operated with the same fuel as the internal combustion engine, i.e., especially diesel oil, gasoline, or gas.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF THE PREFERRED EMBODIMENT

Figure 1:
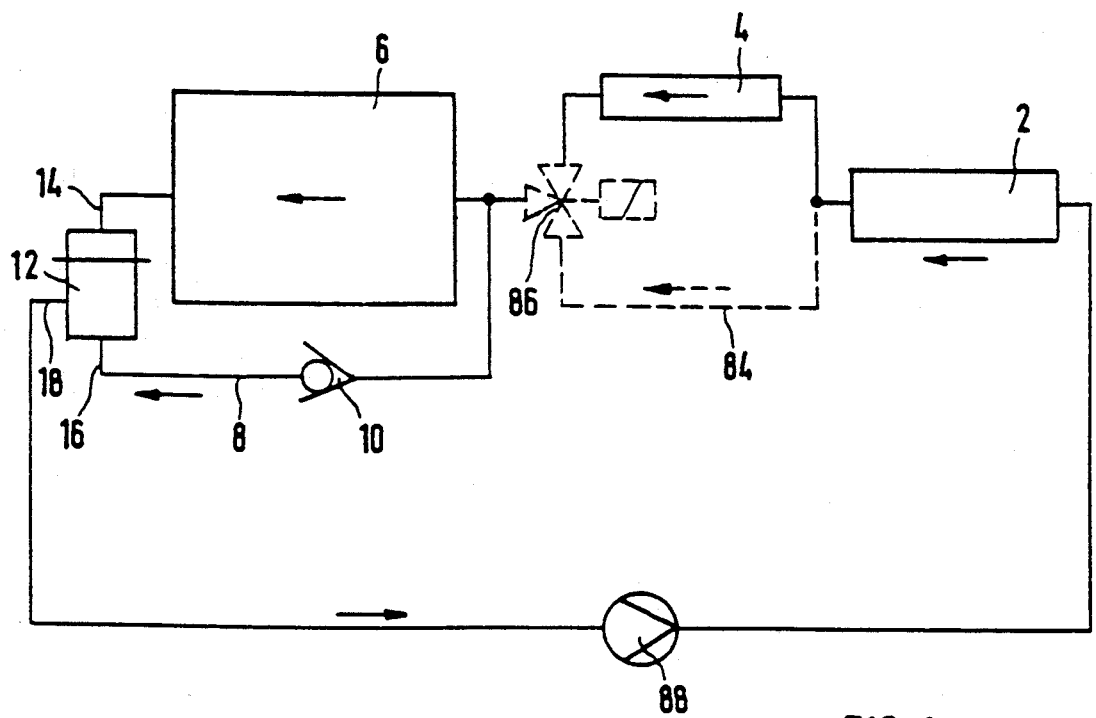
FIG. 1 shows a coolant circuit with its components shown schematically.

The coolant circuit shown in Figure has beginning with a heater 2, essentially the following components, which are connected to one another to form a circuit: The heater 2 with the combustion gas/coolant heat exchanger contained in it; a coolant/air heat exchanger 4 for the internal combustion engine of a vehicle; an internal combustion engine 6; a bypass line 8 leading past the internal combustion engine with the nonreturn valve 10 arranged in it; as well as a thermostat valve 12 at the reentry opening of the bypass line 8 into the circuit behind the engine 6. During operation, a coolant, normally water or a water-glycol mixture, flows through the circuit in the above-described sequence.

Further components, which will be more specifically described below, are shown with broken lines. These components may, but do not have to be, present.

When the heater 2 is in operation, the coolant heated there first flows through the heat exchanger 4, where it releases a variable portion of its heat to heat the interior space of the vehicle. The amount of heat released there depends, e.g., on how far a valve intended to permit flow through the heat exchanger 4 is opened, on the speed of a fan associated with the heat exchanger 4, and the temperature of the air flowing into the heat exchanger 4. After leaving the heat exchanger 4, the coolant flows through the engine 6 and/or the bypass line 8, depending on the position of the thermostat valve 12. When the thermostat valve 12 is in a first end position, in which its first inlet 14 (connected to the engine 6) is closed and its second inlet 16 (connected to the bypass line 8) is open, the total amount of coolant flows through the bypass line 8 to the outlet 18 of the valve 12. Warm coolant is not flowing through the engine 6, and therefore, the motor is not being heated. When the valve is in its second end position, in which the inlet 14 is open and the inlet 16 is closed, the total amount of coolant flows through the engine 6. As a consequence of the heat release taking place there, the coolant flows back to the heater 2 at a temperature that is lower than that with which it would flow back through the bypass line 8. In this case, the situation may arise that the heater 2 is unable to heat, by virtue of its heating capacity, the coolant stream flowing through to the temperature of ca. 80°-95° C. that is optimal for intense heating of the interior space of the vehicle.

If the thermostat valve 12 corresponded to the state of the art, e.g., it would always regulate the coolant temperature at the outlet 18 to a constant temperature or to a temperature within a narrow temperature range, which is predetermined by the thermostat valve. When the coolant temperature at the outlet 18 exceeds the temperature set point, the inlet (14) is opened (more widely). More coolant will flow through the engine 6, and the coolant temperature at the outlet 18 will consequently continue to decrease. When the coolant temperature at the outlet 18 drops below the temperature set point, the inlet 14 is closed (more) and the inlet 16 is opened (more widely); as a consequence of this, the temperature at the outlet 18 increases, because the release of heat to the engine 6 decreases. Consequently, the engine 6 always receives only just enough heat for its heating as is unnecessary with respect to the temperature set point at the outlet 18.

There are situations in which more intense heating of the engine 6 or reduced heating of the engine 6, or elimination of the engine 6 from the heating is desirable, so that a degree of heating of the engine 6 is desired that cannot be reached by the predetermined temperature range of the thermostat valve. One possible situation occurs, e.g., when heating of the engine 6 for easy start is to be ensured after a cold night, and less intense heating of the interior space of the vehicle is possibly accepted in return. Another situation occurs, e.g., when a well-heated vehicle interior space is desired over a rather long period of time, without the engine 6 requiring any heating, or the engine is to be heated less intensely than is made possible by the predetermined temperature range of the thermostat valve, especially because it is to be started only much later, or because the outside temperatures are not low enough to require intense heating of the engine (6).

The design and the function of the thermostat valve 12 will now be described in detail on the basis of FIG. 2. Except for the adjusting frame 20 to be described later and the components associated with it. The thermostat valve 12 is a thermostat valve of conventional design. It has an upper, first intake chamber 24 (which is provided with the inlet 14), a discharge chamber 26 arranged under this (which is provided with the outlet 18), and a second intake chamber 30 arranged under this (which is provided with the inlet 16). The intake chamber 26 accommodates an expanding material element 34 including expanding material element piston 44, on top of an outer part of element 34 there is seated a first valve disk 36 which seals, in the position shown, from the bottom against a valve seat 32 between the first intake chamber 24 and the discharge chamber 26. A second valve disk 40 is fastened to the lower part of the outer part of the expanding material element 34. This valve disk 40 releases a valve seat 38 between the second intake chamber 30 and the discharge chamber 26 in the valve position shown, but closes the valve seat 38 from the top in the other end position of the thermostat valve 12, A displaceable shaft or piston 44, which is supported on a strap 42 in the valve housing 28, extends from the outer part of the expanding material element 34 in the upward direction into the first intake chamber 24.

The expanding material element 34 responds to the coolant temperature in the discharge chamber 26. When this temperature exceeds the response temperature determined by the selected expanding material element 34, the piston 44 extends. Since the piston 44 is unable to move in the upward direction, the entire remaining expanding material element 34 is pushed in the downward direction. The first valve disk 36 opens the valve seat 32, and the second valve disk 40 closes the valve seat 38. Thus, the coolant now flows from the first intake chamber 24 through the discharge chamber 26; the inflow through the second intake chamber 30 is blocked. In contrast, in the position shown, coolant flows from the second intake chamber 30 into the discharge chamber 26; the coolant flow through the first intake chamber 24 to the discharge chamber 26 is blocked.

A first spring 46 between the underside of the first valve disk 36 and an abutment 47 causes the outer part of the expanding material element 34 to return in the upward direction when the temperature drops below the temperature set point. A second spring 48 between the top side of the second valve disk 40 and a shoulder on the expanding material element 34 permits the lower projection 50 of the expanding material element 34 to pass through the second valve disk 40 in the downward direction when this second valve disk 40 is in contact with the valve seat 38 between the discharge chamber 26 and the second intake chamber 30.

Figure 2:
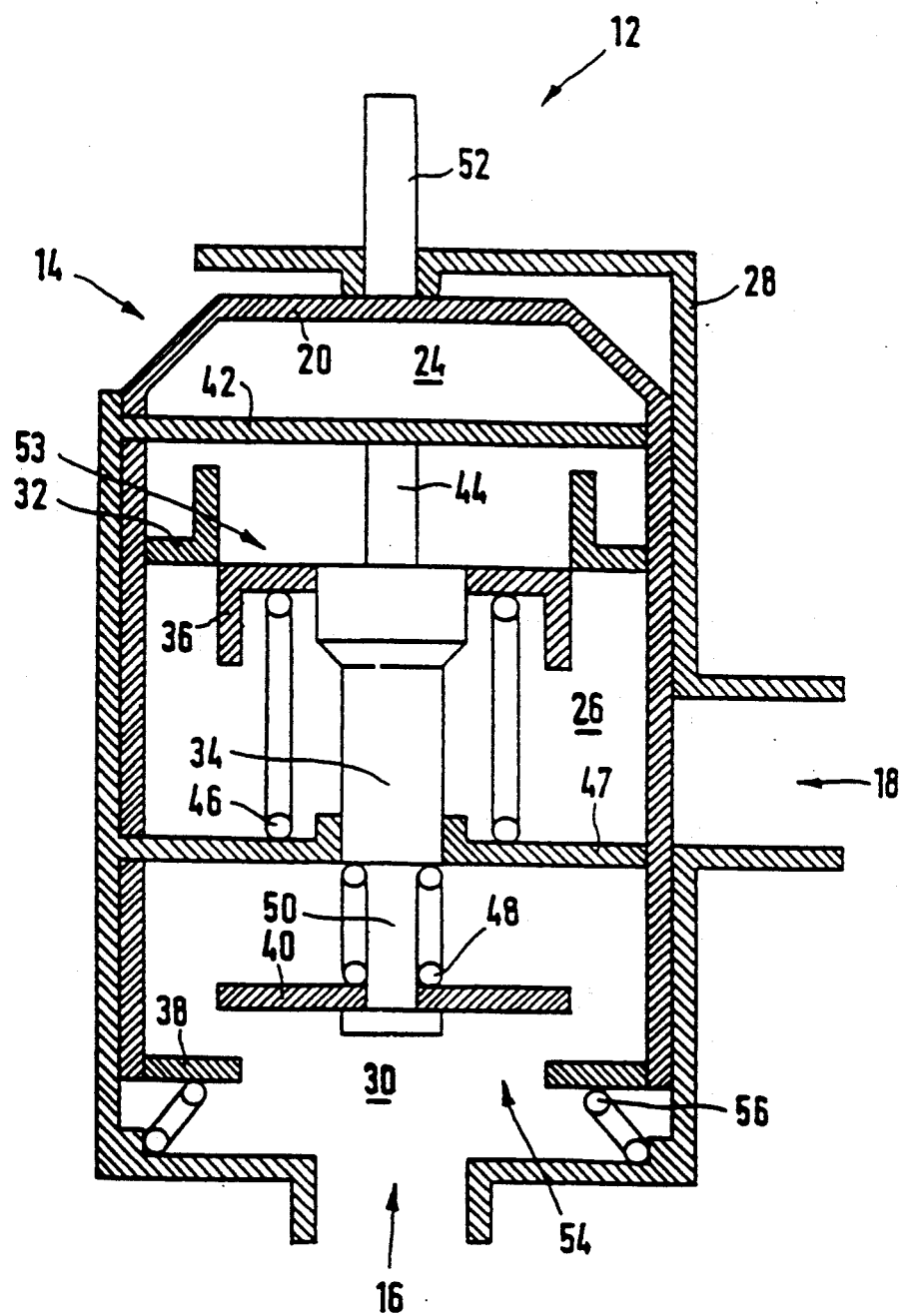
FIG. 2 shows the schematic representation of a thermostat valve according to the present invention.

As is shown in FIG. 2, the valve seats 32 and 38, which serve to separate the intake chamber 24 from the discharge chamber 26 or the intake chamber 30 from the discharge chamber 26, are connected in the thermostat valve 12 according to the present invention with an adjusting frame 20. The adjusting 20 is displaceable within the valve housing 28 via an adjusting piston 52, which is connected to the adjusting frame 20 and extends from the valve housing 28. As will be explained in greater detail below, a change in the opening temperature of a first valve 53 formed by the valve seat 32 and the valve disk 36, and a change in the closing temperature of a second valve 54 formed by the valve seat 38 and the valve disk 40 can be brought about by a relative displacement of the valve seats 32 and 38 connected to the adjusting frame 20 in relation to the valve disks 36 and 40 connected to the expanding material element 34. A spring 56, which permits or supports the resetting movement of the adjusting frame 20 after completion of the adjustment, is arranged between the adjusting frame 20 and the valve housing 28.

Figure 3:
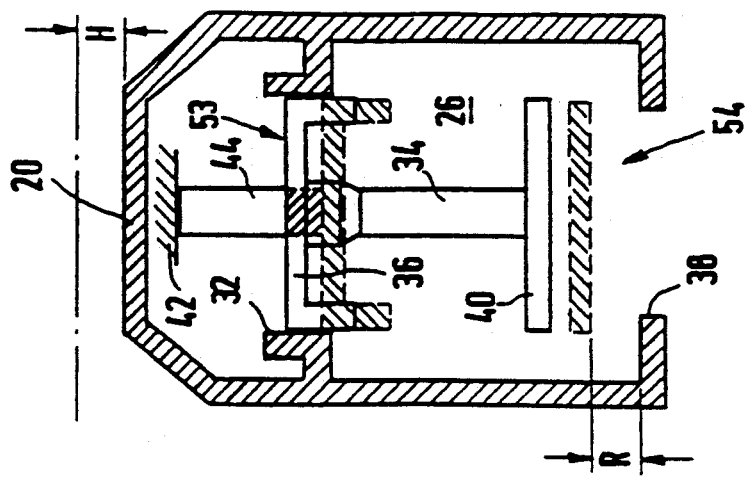
FIG. 3 shows the schematic representation of an expansion material element arranged within an adjusting frame of the thermostat valve according to the present invention.
Figure 4:
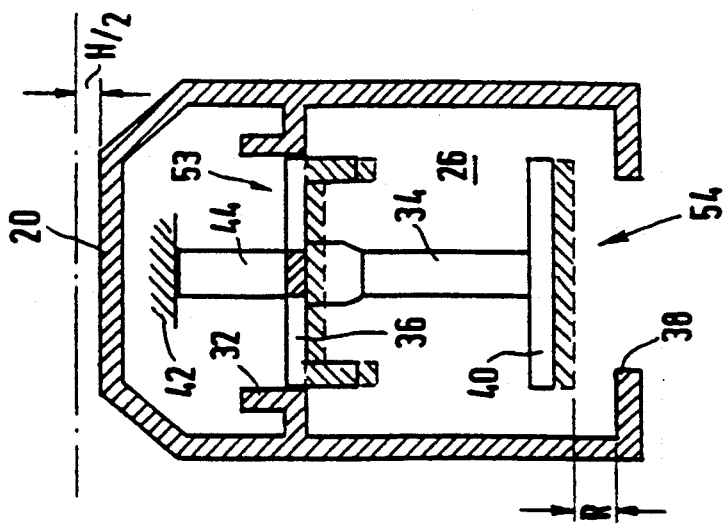
FIG. 4 shows the adjusting frame according to FIG. 3 displaced by a certain amount of displacement in relation to the expansion material element.
Figure 5:
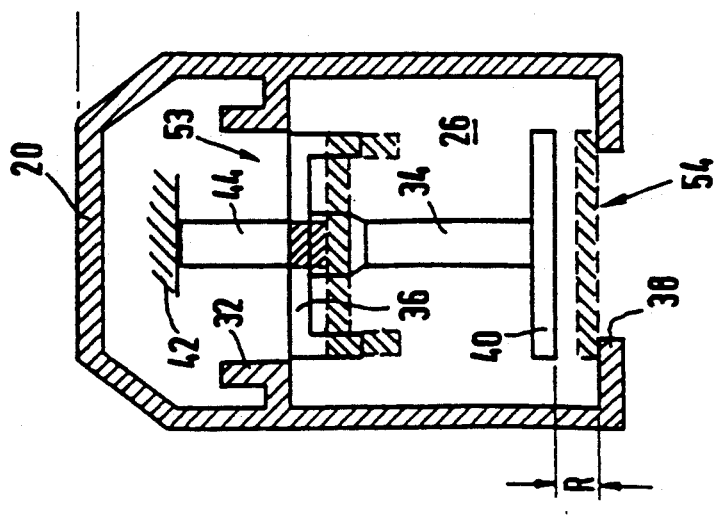
FIG. 5 shows the adjusting frame according to FIG. 3 displaced by an additional amount of displacement in relation to the expanding material element.

FIGS. 3 through 5 show the mode of operation of the thermostat valve 12 according to the present invention. This mode of operation is made possible by the possible relative displacement between the valve seats 32 and 38 connected to the adjusting frame 20 and the valve disks 36 and 40 connected to the expanding material element 34. FIG. 3 shows, in solid lines, the relative position of the adjusting frame 20 in relation to the expanding material element 34, which corresponds to the position in a conventional thermostat valve. In the configuration shown, the expanding material element 34 shall have a response temperature (opening temperature of the valve 53) of 60°C., and the closing temperature of the valve 54 shall be 70° C. The range of adjustment of a thermostat valve of this configuration is consequently defined by a response temperature of 60° C. and a temperature range of 10° C. between the opening and closing of the valve 53 and the valve 54, respectively.

The following explanations always refer to FIGS. 1 and 2 explained in greater detail before. If the temperature increases in the discharge chamber 26 of the thermostat valve, the piston 44 of the expanding material element 34 will expand. The top end of the piston 44 is supported on the strap 42 of the valve housing 28, not shown here, so that displacement of the expanding material element 34 together with the valve disks 36 and 40 in relation to the valve seats 32 and 38 will occur. The valve 53, which closes the flow passage from the intake chamber 24 connected to the internal combustion engine 6 to the discharge chamber 26 at temperatures below 26° C., is opened. Inflow from the intake chamber 24 into the discharge chamber 26 is made possible. The valve 53 is increasingly opened with increasing temperature in the discharge chamber 26, until the valve 54 is finally closed due to the valve disk 40 coming into contact with the valve seat 38 when the closing temperature is reached. The valve disks 36 and 40 are shown in phantom in this position. The crosshatched area of the piston 44 schematically represents the amount of expansion by which the piston 44 expands during an increase in temperature from 60° C. to 70° C.

FIGS. 4 and 5 show how the range of adjustment of the thermostat valve can be adjusted in a simple manner even during the operation of the thermostat valve due to the relative adjustment of the adjusting frame 22 in relation to the expanding material element 34. The adjustment is performed via the adjusting piston 52, not shown in FIGS. 4 and 5, which is connected to the adjusting frame 20, from the outside of the valve housing 28. Starting from the initial configuration shown in FIG. 3, the adjusting frame 20 is adjusted by the amount H/2 in relation to the expanding material element 34 in FIG. 4, and by the amount H in FIG. 5. This leads to a relative displacement between the valve seats 32, 38 and the valve disks 36, 40. As a consequence of this relative displacement and the sleeve-like design of the valve seat 32, the valve 53 in FIGS. 4 and 5 is opened only when the piston 44 of the expanding material element 34 has extended by the amount H/2 or H. Consequently, the valve 53 is opened at a higher opening temperature. In the examples shown, the opening temperature in FIG. 4 shall be 65° C., and the opening temperature in FIG. 5 shall be 70° C. Consequently, different opening temperatures are obtained in the configurations shown in FIGS. 3 through 5, even though the temperature range, represented by the section R, in which the thermostat valve operates, is the same in all three examples. The constant temperature range of 10° C. is obtained from the constant distance of the valve seats 32 and 38 in the adjusting frames 20 shown. If the distance between the valve seats 32 and 38 is designed to be variable, it is, of course, also possible to change the temperature range of the thermostat valve.

The additional possibilities of regulation, which are made possible by the design of the thermostat valve according to the present invention, represented in FIGS. 3 through 5, will be described in greater detail on the basis of the following example. It is assumed here that the thermostat valve 12 is first in an initial configuration corresponding to that shown in FIG. 4. The opening temperature of the engine-side valve 53 is consequently 65° C., and the closing temperature of the valve 54 associated with the bypass line 8 is 75° C. The heater 2 or the coolant/air heat exchanger 4 of the coolant circuit are operated so that a temperature of T=65° C. is obtained at the outlet of the coolant/air heat exchanger 4. Based on these boundary conditions, the preheating of the engine shall be increased in the first case while maintaining the regulating function of the thermostat valve. This can be achieved by selecting a configuration of the thermostat valve 12 corresponding to that shown in FIG. 3. With the same expanding material element 34, the opening temperature of the valve 53 is 60° C., and the closing temperature of the valve 54 is 70° C. As a consequence, the valve 53 will open sooner due to the opening temperature being 5° C. below the coolant temperature, so that flow of heated coolant through the internal combustion engine 6 will become possible sooner. In the second case, engine preheating is to be reduced or eliminated altogether. This is achieved by transforming the thermostat valve 12 into a configuration corresponding to that shown in FIG. 5. As a result, the opening temperature of the valve 53 is increased to 70° C., and the closing temperature of the valve 54 is increased to 80° C. Consequently, compared with the configuration shown in FIG. 3, the valve 53 is opened only when the piston 44 of the expanding material element 34 has expanded by an amount corresponding to a temperature increase by 5° C. The valve 54 of the thermostat valve according to the configuration shown in FIG. 3 is already closed at this temperature difference. The increased opening temperature of the thermostat valve in the configuration according to FIG. 5 causes the engine-side valve 53 not to open at the predetermined coolant temperature of 65° C., so that there is no flow through the internal combustion engine 6. However, should the temperature of the coolant flowing in temporarily increase, e.g., as a consequence of reduction of heat consumption in the interior space of the vehicle, a corresponding release of heat to the internal combustion engine 6 is made possible because the regulating function of the thermostat is maintained.

Figure 6:
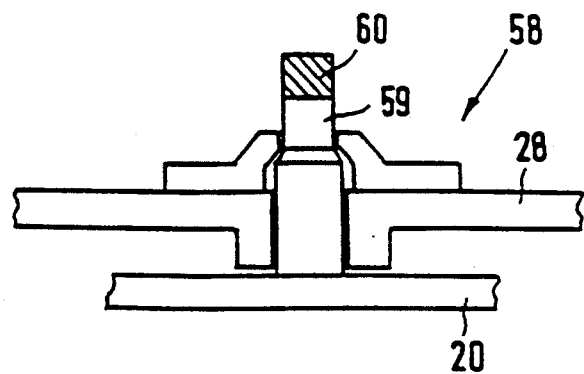
FIG. 6 shows an adjusting frame provided with an electrically heatable expanding material element for adjusting the adjusting frame.
Figure 7:
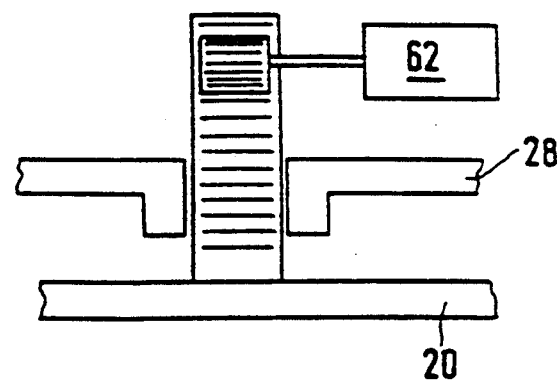
FIG. 7 shows an adjusting drive provided with an electric motor.
Figure 8:
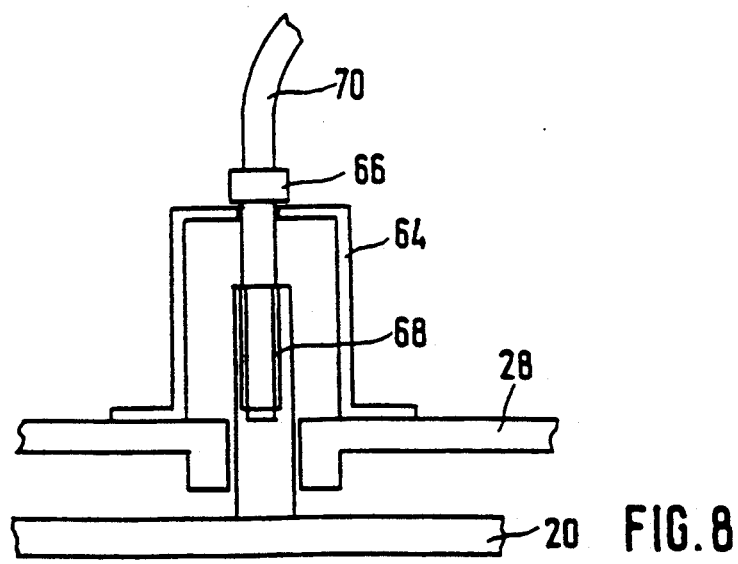
FIG. 8 shows an adjusting drive provided with an adjusting screw.

FIGS. 6 through 8 show various possibilities of adjusting the adjusting frame 20 via an adjusting drive. FIG. 6 shows an adjusting drive 58, which is obtained essentially by designing the adjusting piston 52 acting on the adjusting frame 20 as an expanding material element 59. The expanding material element 59 is electrically heatable by means of a posistor 60. When the expanding material element 59 is activated, the piston 52 pushes the adjusting frame against the spring 56 shown in FIG. 2 into a different position. The posistor 60 may be actuated, e.g., from the dashboard of the motor vehicle, or it may be coupled with a suitable measurement transducer, e.g., the oil temperature sensor of the engine. Thus, automatic adjustment of the adjusting frame 20 depending on the oil temperature of the engine would be possible in the latter case.

FIG. 7 schematically illustrates how an electric motor 62 may be used as an adjusting drive 71. FIG. 8 shows a possibility for the manual adjustment 72 of the adjusting frame 20, wherein an adjusting screw 66 supported on the valve housing 28 via an abutment 64 is used. In this case, the adjusting piston 52 of the adjusting frame 20 is provided with a tapped hole 68, so that the relative position between the adjusting frame 20 and the valve housing 28 can be changed by screwing the adjusting 66 into and out of the tapped hole 68. The adjusting screw 66 may be connected to a flexible shaft 70, so that simple adjustment from the driver's dashboard is possible in this case as well.

The components shown by broken lines in FIG. 1 are a bypass line 84 for the heat exchanger 4, a control valve 86 associated with the bypass line 84. Further, an auxiliary water pump 88 may be provided in the return line (connected to outlet 18) from the engine 6 to the heater 2. The bypass line 84 and the control valve 86 at the reentry of the bypass line 84 permit particularly good regulation of the heating temperature of the interior space of the vehicle. When the desired temperature of the interior space of the vehicle is reached, the control valve 86 will perform its control function so that coolant heated in the heater 2 will bypass the heat exchanger 4, and vice versa. The auxiliary water pump 88 is favorable in the case of coolant circuits of great length. It is dispensable especially in the case of shorter coolant circuits, because the heater 2 normally has an integrated coolant pump.

While specific embodiments of the invention have been shown and described in detail to illustrate the application of the principles of the invention, it will be understood that the invention may be embodied otherwise without departing from such principles.

What is claimed is:

1. A coolant circuit for a motor vehicle, comprising: an internal combustion engine; a coolant/air heat exchanger for heating an interior space of the motor vehicle; an independent heater generating heat by combustion, said heater including a combustion gas/coolant heat exchanger; a coolant circuit line connected to said internal combustion engine, said combustion gas/coolant heat exchanger and said heater; a bypass line, connected to said coolant circuit line and bypassing said internal combustion engine; and a thermostat valve connected to said coolant circuit line, downstream of said internal combustion engine, and connected to said bypass line for regulating a return temperature within a predetermined range of adjustment by controlling coolant flow through said bypass line and through said coolant circuit line, downstream of said internal combustion engine, said thermostat valve including a valve housing including two intake chambers and one discharge chamber, a valve piston formed of an expanding material element connected to two valve disks, said valve disks cooperating with valve seats to separate said intake chambers from said discharge chamber, adjusting means for moving the relative position of said valve seats with respect to said valve disks, said adjusting means being operable from the outside of said valve housing, at least one cooperating pair of said valve seats and said valve disks being shaped such that sealing of said at least one cooperating pair is independent of a change in relative position of the valve disk and the valve seat, over a range of relative movement of said valve seat with respect to said valve disks.

2. A coolant circuit according to claim 1, wherein said thermostat valve adjusting means includes an adjusting drive.

3. A thermostat valve for cooling a coolant flow in a coolant circuit for a motor vehicle, comprising: a coolant circuit connecting an independent heater and an internal combustion engine for motor vehicles and a heat exchanger for heating an interior space of a motor vehicle, a valve housing including two intake chambers and one discharge chamber; a valve piston formed of an expanding material element connected with two valve disks, said valve disks cooperating with valve seats to separate said intake chambers from said discharge chamber; means for moving the relative position of said valve seats with respect to said valve disks, said means being operable from the outside of said valve housing, at least one cooperating pair of said valve seats and said valve disks being shaped such that sealing of said at least one cooperating pair is independent of a change in relative position of the valve disk and seats with respect to said valve disks.

4. A thermostat valve according to claim 3, wherein one of said cooperating valve seats and valve disks is associated with an engine-side intake chamber and is formed as a sleeve extending in parallel to a direction of expansion of the expanding material.

5. A thermostat valve according to claim 3, wherein said valve seats are connected to an adjusting device, said adjusting device being positioned guidingly in said valve housing, said adjusting device being connected to an adjusting piston for adjusting the position of said valve seats from outside of said housing.

6. A thermostat valve according to claim 3, wherein said adjusting means comprises an adjusting frame which defines said valve seats.

7. A thermostat valve according to claim 3, wherein said adjusting means comprises an adjusting frame which accommodates said valve seats.

8. A thermostat valve according to claim 3, wherein said adjusting means includes an adjusting piston extending outwardly from said valve housing, said adjusting piston being operatively connected to an adjusting drive for moving said adjusting means.

9. A thermostat valve according to claim 8, wherein said adjusting drive comprises an electric motor.

10. A thermostat valve according to claim 8, wherein said adjusting drive comprises an adjusting screw.

11. A thermostat valve according to claim 8, wherein said adjusting drive includes an electrically heatable thermally expanding material element.

* * * * *